D. Y. STRAUSS.
MANUFACTURE OF PLASTER RETARDER FROM BEAN VINES.
APPLICATION FILED MAR. 26, 1914.

1,134,964.

Patented Apr. 6, 1915.

Witnesses
M. Cramer
L. Hoffman

Inventor
Dennis Y. Strauss
by James T. Barkeler
his Attorney.

UNITED STATES PATENT OFFICE.

DENNIS Y. STRAUSS, OF ARTESIA, CALIFORNIA, ASSIGNOR TO CALIFORNIA RETARDER & FIBRE COMPANY, OF LOS ANGELES, CALIFORNIA, A CORPORATION OF CALIFORNIA.

MANUFACTURE OF PLASTER-RETARDER FROM BEAN-VINES.

1,134,964. Specification of Letters Patent. Patented Apr. 6, 1915.

Original application filed November 11, 1913, Serial No. 800,269. Divided and this application filed March 26, 1914. Serial No. 827,295.

*To all whom it may concern:*

Be it known that I, DENNIS Y. STRAUSS, a citizen of the United States, residing at Artesia, in the county of Los Angeles, State of California, have invented new and useful Improvements in Manufacture of Plaster-Retarder from Bean-Vines, of which the following is a specification.

This invention relates to the manufacture of plaster retarder and the like from bean vines of all sorts, chiefly of the genus *Phaseolus;* and this application is in the nature of a division from my application S. N. 800,269 filed November 11th, 1913.

In this application, I wish to generally set forth my process for treating bean vines (*Phaseolus*); and then to particularly describe and claim that portion of my complete process which relates particularly to the extraction and preparation of plaster retarder from bean vines, such as Lima beans, field beans, navy beans and all others. In the efficient practice of my process I may, and do, simultaneously extract and prepare a number of products, of which plaster retarder is but one; but it will be understood that the process of extraction and preparation of plaster retarder may be separately practised, although the simultaneous extraction and production of several different products is the most efficient procedure and will probably be the mode in which my process will invariably be put into practical use.

After a short general description of my whole method and a particular description of the divisional process relating directly to plaster retarder, I herein explain the peculiar qualities and excellencies of said plaster retarder formed from bean vines.

Figure 1:
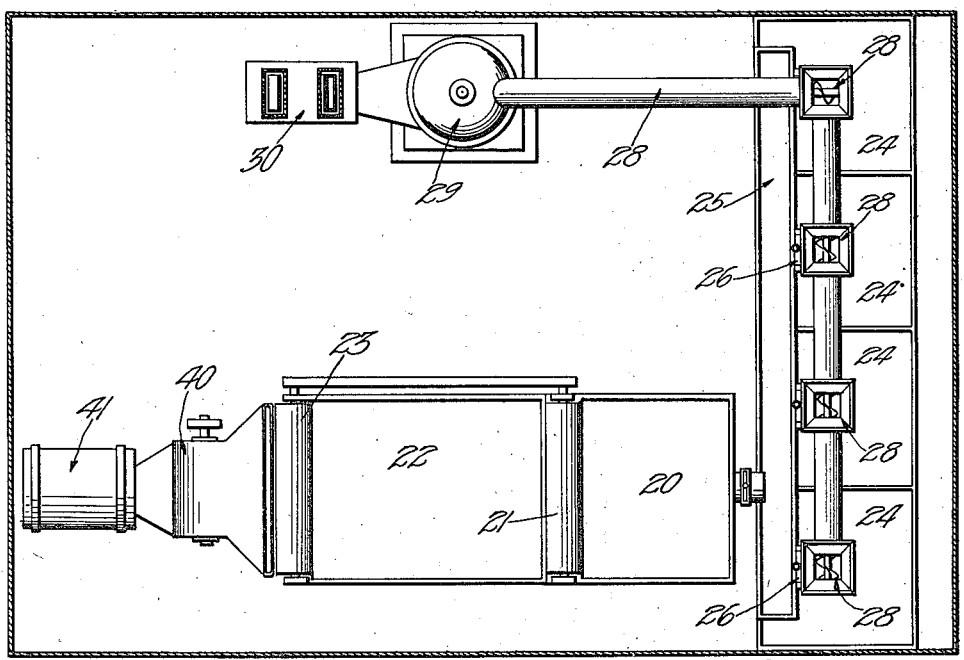
Figure 2:
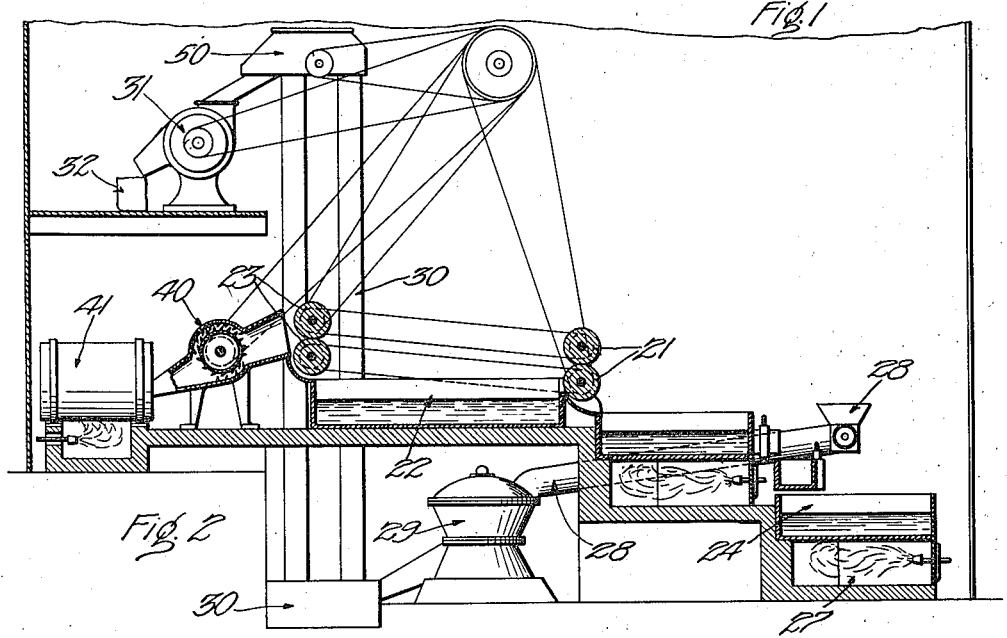

I have illustrated preferred forms of apparatus for my process in the accompanying drawings, in which, Figure 1 is a plan view of a plant capable of carrying out my process; Fig. 2 is an elevation thereof.

The bean vines (*Phaseolus*), are commonly brought from the field in a dried condition. Beans are threshed from the vines after the vines and beans have been dried in the field; so that the vines thrown off by the thresher are necessarily fairly dry. These dried vines are produced in enormous quantities each year; and it is the prime object of my invention to extract valuable products therefrom. The first operation of my process is to boil the vines in a boiling vat 20 in clear water or in any other suitable liquid. A certain amount of the liquid content of the vines is extracted by the boiling; but the main object of boiling is to loosen the fiber of the vines. I next pass the vines between suitable crushers or crushing rolls 21, whence they are passed through a vat 22 containing clear water. From the rinsing vat the vines are then passed through another set of crushing rolls 23 where a high percentage of the remaining absorbed liquid and liquid content of the vine is removed. The liquids removed by crushing run back through the vat 22, overflowing into the boiling vat 20; and from the boiling vat the liquids are taken through any suitable distributing system into evaporating vats 24. The distributing system from the boiling vat 20 may involve a sluiceway 25, or any other suitable means, having outlets 26 into the various evaporating vats 24, so that the evaporating vats may be charged at will. Heat is supplied to the evaporating vats in any desired manner, as by a furnace 27 underneath each vat. When the liquid in any vat has been partially evaporated, the remaining thick liquid is absorbed by a suitable absorbent, the nature of the absorbent depending upon the use to which the final product is put. The absorbent is allowed to remain until the free moisture is reduced to about three per cent., the remainder being taken up by crystallization. The caked solid is removed from the vat into suitable conveyers 28 where it is carried to a crusher 29, preferably of the rotary type. From this crusher the product is elevated by elevator 30 and is discharged into a pluverizer 31, when it is ready to be sacked for shipment as illustrated at 32. The moist fiber emerging from the last set of crushing rolls 23 passes to a rotary shredder 40 or the like, and thence into a drier 41 of any preferred construction. I may use any of the forms of shredder or drier now obtainable on the market. I may use a pulping machine instead of a shredder, putting out the final product in pulp form for manufacture of various kinds. The resultant fiber or pulp product emerging from the drier may be sacked or bailed for commercial use.

The foregoing describes my general process for the extraction of different valuable constituents from bean vines.

In the specific process for the manufacture of plaster retarder, I extract the liquid and soluble content of the vines as above explained. The boiling has the effect of loosening the vine structure and dissolving the soluble content; the crushing operation frees the vines of most the original moisture and of the liquid absorbed in the boiling vat, together with the matter dissolved therein. All this extracted liquid is brought together in the boiling vat, whence it is withdrawn to the battery of evaporation vats and is evaporated. Partial or complete evaporation takes place. The completely evaporated cake, crushed and ground, may be used itself as a plaster retarder. But, I prefer to utilize a carrier in which the partially evaporated liquid is absorbed. Thus, I preferably evaporate a portion of the water of the liquid and then use lime as an absorbent and carrier. The resultant cake, crushed and ground, is ready for use.

I have described my retarder made from an extract of the bean vine, leaving the fiber to be otherwise utilized. But the whole of the vine, or the leafy and pod portions thereof, may be simply ground and then used as retarder, without or with lime.

My plaster retarder has many features of excellence. Whether the pure extract or the absorbed extract is used, my retarder has beneficial effects on plaster and the like without the usual detriments. Many retarders in use today cannot give much retarding effect; for the reason that only a small portion of such retarders can be used without crumbling or disintegrating the plaster, etc. My plaster can be used in any desired proportion; and, however slowly the plaster is constrained to set by the use of a large proportion of my retarder, it will ultimately set. And my retarder has the advantage of not disintegrating or decomposing the plaster, regardless of the quantity used. This is its prime feature of excellence; and, moreover, it is very inexpensive, due to the fact that it is made by a simple and inexpensive process from material enormously produced each year and which is now considered waste product and which is burned or otherwise destroyed.

With my retarder, as above prepared, six or seven pounds suffices ordinarily for one ton of plaster; but as much as twenty pounds may be used to give more retardation. With the ordinary plaster retarder about six pounds is the maximum per ton of plaster; any larger amount will cause disintegration of the plaster. Certain grades of gypsum cannot now be used for plaster for the reason that they set so quickly that the maximum possible amount of ordinary retarder will not sufficiently retard them—a larger amount of retarder will spoil the plaster. My retarder thus makes possible the use of gypsums hitherto useless. Another feature of my retarder is its non-rusting quality; it will not rust metal lath, whereas ordinary retarders quickly destroy metal lath by rust.

I claim—

1. The herein described method of making plaster retarder, comprising extracting the liquid and soluble constituents of bean vines, and absorbing the extract in lime.

2. The herein described method of making plaster retarder, comprising extracting the liquid and soluble constituents of bean vines, partially evaporating the extract, and absorbing the residuum in lime.

3. The herein described method of making plaster retarder, comprising extracting the liquid and soluble constituents of Lima bean vines, and absorbing the extract in lime.

4. The herein described method of making plaster retarder, comprising extracting the liquid and soluble constituents of Lima bean vines, partially evaporating the extract, and absorbing the residuum in lime.

5. As a retarder for plaster and the like, a substance composed of the evaporated liquid and soluble extract from bean vines absorbed in an earthy absorbent.

6. As a retarder for plaster and the like, a substance composed of the evaporated liquid and soluble extract from bean vines absorbed in lime.

7. As a retarder for plaster and the like, a substance composed of the evaporated liquid and soluble extract from Lima bean vines absorbed in lime.

8. The herein described method of making plaster retarder, comprising extracting the liquid and soluble constituents of bean vines and absorbing the extract in an earthy absorbent.

9. The herein described method of making plaster retarder, comprising extracting the liquid and soluble constituents of bean vines, partially evaporating the extract and absorbing the extract in an earthy absorbent.

In witness that I claim the foregoing I have hereunto subscribed my name this 20th day of March, 1914.

DENNIS Y. STRAUSS.

Witnesses:
TIMOTHY MAHONEY,
H. B. MILLS.